3,516,195
SOUNDING CORD TWIST TOY
Ray E. Batley, Birmingham, Mich., assignor to Robert A. Kramer, doing business as Kramer Designs, Birmingham, Mich.
Filed Nov. 13, 1967, Ser. No. 682,282
Int. Cl. A63h *1/28, 27/12, 5/00*
U.S. Cl. 46—63                                            6 Claims

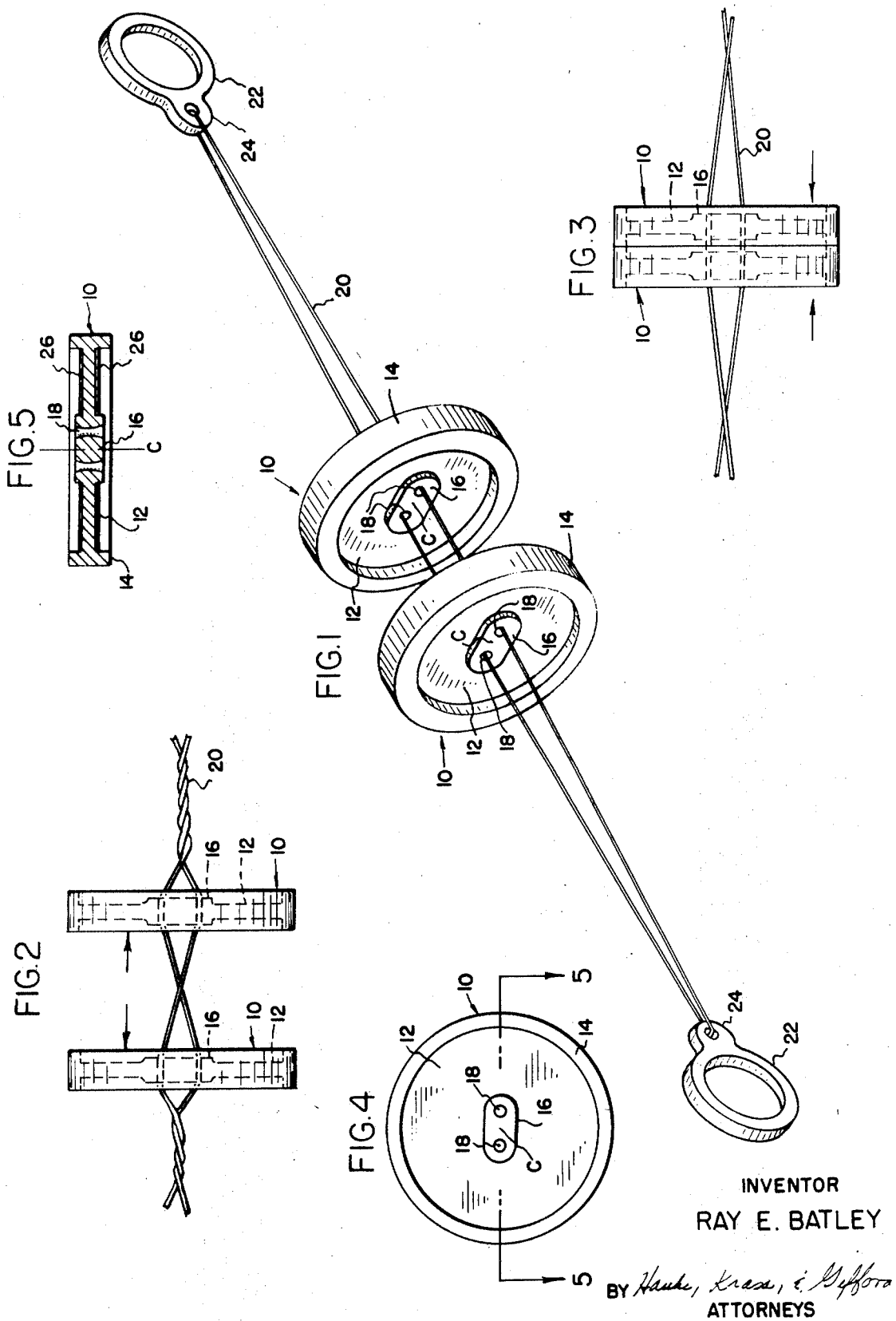

ABSTRACT OF THE DISCLOSURE

A plurality of rimmed disks having centrally located hubs provided with a pair of perforations therethrough are threaded on a loop of cord along with a pair of ring elements which can be held by an operator for manipulation by which the cords are alternately twisted and untwisted to cause the disks to spin oscillatingly and gyroscopically and to move together and apart with a rhythmic and percussive effect.

BACKGROUND OF THE INVENTION

Cardboard disks and buttons have been used for many years by children, particularly as a toy in which the disk or button is threaded on a loop of string and made to spin by alternately twisting and untwisting the string on applying a rhythmic tension thereto.

SUMMARY OF THE INVENTION

The present invention is a refinement of the above described toy, in which a plurality of disk elements, preferably made of plastic or other relatively hard material, each disk having specially formed peripheral rims, are threaded on a loop of cord. When the cord is alternately twisted and untwisted by applying a rhythmic tension to the cord, the action of the cord will cause the disks to move apart and then snap together with a percussive effect due to the rims providing a hollow space between the two disks as they move together, producing something in the nature of a castinet-type sound.

The rims on the disks provide a central recess in which decorative disks of paper or the like may be inserted, and the disks are slightly unbalanced so that in spinning they will tend to describe large arcs so that the disks will appear to expand and contract producing a variable design effect.

BRIEF DESCRIPTION OF THE DRAWING

The present invention will be more fully understood by reference to the accompanying drawing illustrating a preferred embodiment of the invention in which like reference characters refer to like parts throughout the several views, and in which:

FIG. 1 is a perspective view of a preferred embodiment of the invention;

FIG. 2 is a fragmentary elevational view of the disks of the invention at a moment when the twisted cord on which they are carried has forced them to move apart;

FIG. 3 is a fragmentary view showing the disks at a time when the action of the cord has caused them to move together;

FIG. 4 is an elevational plan view of one of the disk members of the present invention; and FIG. 5 is a cross-sectional view taken substantially on the line 5—5 of FIG. 4.

DESCRIPTION OF THE PREFERRED EMBODIMENT

In the preferred embodiment of my invention, a pair (or more) of disk members 10 are provided, preferably made of a hard plastic of any preferred type, with each disk member 10 provided with a planar central portion 12 and a peripheral rim 14 extending normal to the planar portion 12, forming a substantially circular recess on both sides of the disk member 10 as shown. The central planar portion 12 is provided with an elongated hub 16 through which extend a pair of holes 18 equally spaced from the centerline axis C of the member 10.

A closed loop of cord 20 is threaded through the holes 18 as shown in FIGURES 1, 2 and 3, and a pair of ring elements 22 having perforated projections 24 are arranged to be attached to the cord 20 as shown. The holes 18 extending through the hubs 16 have convex inner surfaces as shown in FIGURE 5 for a purpose to be explained. The hubs 16 extend from the faces of the portion 12 less than do the rims 14. The faces of the planar portion 12 also are preferably decorated or have adhesively secured thereto disks 26 made of paper or the like and having a decorative design (design not illustrated).

The device above described is operated by manually grasping the ring elements 22, one by each hand, and swinging the disks 10 in an arc to twist the loop of cord 20. Pulling the ring elements 22 apart to apply tension to the cord 20 will force it to untwist and spin the disk members 10. The members 10 will continue to spin and retwist the cord 20 in the opposite direction as the manipulator relaxes the tension somewhat. Applying tension again will cause the cord to stop twisting and begin untwisting. Thus the disk members 10 may be caused to spin oscillatingly and gyroscopically faster and faster, with the cord alternately twisting and untwisting. When the cord is substantially untwisted, as indicated in FIG. 3, the holes 18 of the disks will be aligned with the portions of the cord extending straight between them, so that when tension on the cord 20 is relaxed and it begins to twist due to the spinning of the disk element 10, the cord 20 will apply a squeezing effect on the outermost sides of the perforations 18 which as described are convexly tapered as shown in FIG. 5 for this purpose. This causes the disk members 10 to move together in the direction of the arrows of FIG. 3 with a rapid percussive effect, making a hollow castinet-type of sound. As the cord becomes more fully twisted, a twist will occur between the hubs 16 since there is a space between them due to the hubs not extending outwardly from the planar surfaces of the portions 12 as much as the rims 14, and this twist will force the disk members 10 to separate as in FIG. 2. Thus with continued manipulation, the disk elements will move apart and together rhythmically with a tempo depending on how rapidly the operator applies tension to the cord 20. The rims 14 of the disk members 10 also provide them with a gyroscopic effect, so that if the manipulator varies the angle at which the cord 20 extends from the disk members 10, they will tend to wobble and come together with an irregular castinet-type effect.

With the holes 18 flared outwardly as shown in FIG. 5, only smooth surfaces will contact the surfaces of the cord 20, reducing the possibility of wear.

The disk elements 10 are deliberately made without any high degree of precision, however, so that inherent unbalance will cause them when spinning at high speed to describe increasingly larger arcs, so that the decorative designs will appear to expand and contract as the device is used, producing various visual effects and patterns. Various other sound effects such as humming and whistling can be provided by perforating or notching the rims 14 or perforating the central discs 12, or by attaching to the disks 12 or rims 14 reed-like elements (not shown).

Although I have described and shown only one preferred embodiment of my invention, it will be apparent to one skilled in the art to which the invention pertains that various changes and modifications may be made

What is claimed is:
1. An entertainment device comprising:
   (a) a plurality of disk members each having a planar central portion with a pair of spaced holes near and oppositely offset the center and being otherwise imperforate, and a peripheral rim extending from at least one side normal to the plane of said central portion, and
   (b) a loop of cord extending through the holes and arranged to hold the disk members with their rims facing each other, whereby manipulation by twisting and untwisting said cord causes said disk members to spin oscillatingly and gyroscopically and to move together and apart with rhythmic percussive effect.

2. The device as defined in claim 1 and including a pair of ring elements secured to said cord on opposite sides of said disk members for manipulation thereof by holding one ring element with each hand of the manipulator.

3. The device as defined in claim 2 and in which each ring element comprises a ring of rigid material having a perforated projection extending therefrom, the cord passing through the perforation.

4. The device as defined in claim 1 and in which said peripheral rims of said disk members extend from both sides of said central portions.

5. The device as defined in claim 1 and in which said central portions of said disk elements each has a diametrically elongated central hub projecting from at least one face of said central portion, and said holes extend through said hub normal to the plane of said central portion.

6. The device as defined in claim 1 and in which the holes through each disk member flare outwardly whereby to present only smooth surfaces to the surfaces of the cords extending therethrough and whereby the cord will produce a rhythmic squeezing effect to cause the disk members to snap together intermittently.

References Cited
UNITED STATES PATENTS

| | | | |
|---|---|---|---|
| 2,161,154 | 6/1939 | Gertler | 46—62 |
| 2,662,337 | 12/1953 | Burkey | 46—63 |
| 3,131,506 | 5/1964 | Fox | 46—63 |

ANTONIO F. GUIDA, Primary Examiner

R. F. CUTTING, Assistant Examiner

U.S. Cl. X.R.

46—191